US007127138B2

(12) United States Patent
Efimov et al.

(10) Patent No.: US 7,127,138 B2
(45) Date of Patent: Oct. 24, 2006

(54) APPARATUS AND METHOD FOR DIRECTING A LIGHT BEAM TO A TARGET

(75) Inventors: Oleg M. Efimov, Newbury Park, CA (US); Stanislav I. Ionov, Calabasas, CA (US)

(73) Assignee: The Boeing Company, Chicago, IL (US)

( * ) Notice: Subject to any disclaimer, the term of this patent is extended or adjusted under 35 U.S.C. 154(b) by 77 days.

(21) Appl. No.: 10/719,543

(22) Filed: Nov. 20, 2003

(65) Prior Publication Data

US 2005/0111791 A1 May 26, 2005

(51) Int. Cl.

| | |
|---|---|
| ***G02B 6/32*** | (2006.01) |
| ***G01B 9/02*** | (2006.01) |
| ***F41G 7/00*** | (2006.01) |
| *G03H 1/10* | (2006.01) |

(52) U.S. Cl. .......................... 385/33; 385/147; 385/12; 385/31; 356/450; 359/10; 359/15; 244/3.13; 244/3.16; 244/3.17

(58) Field of Classification Search ................ 385/147, 385/12, 31, 33; 356/450, 452, 455; 359/204, 359/205, 223, 226, 399, 10, 15, 34; 244/3.13, 244/3.16, 3.17

See application file for complete search history.

(56) References Cited

U.S. PATENT DOCUMENTS

| | | | | |
|---|---|---|---|---|
| 3,567,163 | A * | 3/1971 | Kepp et al. | 244/3.14 |
| 3,834,786 | A | 9/1974 | Carlsen | 350/3.5 |
| 4,161,652 | A * | 7/1979 | Moreau et al. | 250/203.1 |
| 4,299,360 | A * | 11/1981 | Layton | 244/3.13 |
| 4,446,363 | A * | 5/1984 | Lakin et al. | 250/252.1 |
| 5,197,691 | A * | 3/1993 | Amon et al. | 244/3.13 |
| 5,621,813 | A * | 4/1997 | Brown et al. | 382/151 |
| 5,719,690 | A * | 2/1998 | Burland et al. | 359/4 |
| 6,088,321 | A * | 7/2000 | Yamaji et al. | 369/103 |
| 6,181,665 | B1 * | 1/2001 | Roh | 369/103 |
| 6,256,281 | B1 * | 7/2001 | Tanaka et al. | 369/103 |
| 2004/0067017 | A1 | 4/2004 | Ionov et al. | 385/37 |

OTHER PUBLICATIONS

Y. Painchaud et al., "Chirped fibre gratings produced by tilting the fibre", Electronics Letters, IEEE, Feb. 2, 2005, pp. 171-172, vol. 31, No. 3.

I. Bennion et al., "UV-written in-fibre Bragg gratings", Tutorial Review, Optical and Quantum Electronics, May 31, 1995 and Aug. 8, 1995, pp. 93-133, vol. 28.

A. Othonos et al., "Fiber Bragg Grating: fundamentals and application in telecommunication and sensing", Chapter 4, Inscribing Bragg Gratings in Optical Fibers, 1999, pp. 149-187.

* cited by examiner

*Primary Examiner*—Brian M. Healy
(74) *Attorney, Agent, or Firm*—Thomas F. Lebens; Fitch, Even, Tabin & Flannery

(57) ABSTRACT

An apparatus for directing light beams onto a target comprising a beam splitter for splitting a main beam into a first split beam and a second split beam; a first beam path for the first split beam, the first beam path including a first aperture, a first lens and a second lens; a second beam path for the second split beam, the second beam path including a second aperture, a third lens and a fourth lens; a plurality of mirrors arranged such that the first split beam and the second split beam intersect at the target. An apparatus can also include means for placing a target in the image plane of a first aperture and a second aperture.

17 Claims, 7 Drawing Sheets

APPARATUS AND METHOD FOR DIRECTING A LIGHT BEAM TO A TARGET

BACKGROUND OF THE INVENTION

1. Field of the Invention

The present invention relates to optics. More specifically, the present invention relates to an optical setup for writing high-quality interference patterns with a well characterized period and chirp.

2. Discussion of the Related Art

Many satellite and terrestrial optical communication systems require transmission of analog optical signals. Commonly, amplitude modulation of the optical carrier is used. However, this approach suffers from poor signal to noise ratio. It is well known that broadband modulation schemes that utilize higher bandwidth than that of the transmitted waveform may improve the signal to noise ratio over that using amplitude modulation. Pulse position modulation (PPM) is one such technique. In pulse position modulation, a shift in the pulse position represents a sample of the transmitted waveform. This is shown in FIG. 1. It can be shown that for a given power source $SNR_{PPM} \propto SNR_{AM} (t_P/\tau)_2$ where $t_p$ is the spacing between the unmodulated pulses and $\tau$ is the pulse duration, respectively. Pulse position modulation for optical communications requires new techniques for generating trains of optical pulses whose positions are shifted from their unmodulated positions in proportion to the amplitude of a transmitted waveform. Various types of devices are known to those skilled in the art. Such devices utilize distributed feedback reflector in electro-optically active waveguides. Techniques for forming distributed feedback methods are inconsistent.

One of the steps in creating a distributed feedback reflector includes creating an interference pattern on a layer of photo resist. The photo resist is then exposed, for example, to ultra-violet light in order to create a desired pattern. The interference patterns for surface and volume holograms are generally created with one of the following: wavefront-splitting interferometers, phase-masks, and amplitude-splitting interferometers.

Wavefront-splitting interferometers provide two interfering beams that are carved from different areas of the wavefront of a spatially coherent beam. Such splitting however, results in diffraction at the boundary of the cut, causing parasitic fringes.

Phase-masks are illuminated by a single laser beam, creating interfering beams on a closely positioned target. Because of its simplicity, this technique has been very popular for writing fiber Bragg gratings with uniform periods. Phase masks may also be used for making linearly-chirped gratings. The major drawback of this method is due to the imperfections of available phase masks. Usually, a third beam (zero-order diffraction) is present at the output of the phase mask in addition to the desirable first-order diffracted beams. Since the intensity of the parasitic beam is relatively high (typically 3–5%), it causes strong (more than 50%) parasitic modulation of the hologram at a double period.

Amplitude splitting interferometers create two interfering beams by splitting a parent beam in two on a partially-reflecting beam splitter. The beams are then spatially shaped and combined on a target. With this technique, large-area holograms have been written using beam expanders. Furthermore, interference patters with linear and quadratic chirps have been manufactured employing optical beams with spherical wavefronts. This technique, however, requires considerable beam expansion for achieving uniform illumination across large areas. As has been already mentioned, this creates unwanted diffraction on system apertures.

It would therefore be desirable to provide a system for writing high-fidelity gratings with well-characterized periods and chirps.

SUMMARY OF THE INVENTION

In one embodiment, the invention can be characterized as an apparatus for directing light beams onto a target comprising a beam splitter for splitting a main beam into a first split beam and a second split beam; a first beam path for the first split beam, the first beam path including a first aperture, a first lens and a second lens; a second beam path for the second split beam, the second beam path including a second aperture, a third lens and a fourth lens; and a plurality of mirrors arranged such that the first split beam and the second split beam intersect at the target.

In another embodiment, the invention can be characterized as an apparatus for direct light beams onto a target comprising means for generating a beam of light; means for splitting the beam of light into a first split beam of light and a second split beam of light; means for expanding the first split beam of light; means for expanding the second split beam of light; means for directing the first split beam of light and the second split beam of light at a target such that the first split beam of light and the second split beam of light intersect at a first angle; and means for placing a target in the image plane of a first aperture and a second aperture.

In a subsequent embodiment, the invention can be characterized as a method of directing light beams onto a target comprising the steps of generating a beam of light; splitting the beam of light into a first split beam of light and a second split beam of light; directing the first split beam through a first aperture; expanding the first split beam of light in a first telescope; directing the second split beam through a second aperture; expanding the second split beam of light in a second telescope; and directing the first split beam of light and the second split beam of light at a target such that the first split beam of light and the second split beam of light intersect at a first angle.

BRIEF DESCRIPTION OF THE DRAWINGS

The above and other aspects, features and advantages of the present invention will be more apparent from the following more particular description thereof, presented in conjunction with the following drawings, wherein.

DETAILED DESCRIPTION

The following description is not to be taken in the limiting sense, but is made merely for the purpose of describing the general principals of the invention. The scope of the invention should be determined with reference to the claims.

This application incorporates by reference U.S. patent application Ser. No. 10/266,836, filed Oct. 8, 2002, now abandoned, entitled TECHNIQUE AND METHOD FOR MANUFACTURING DISTRIBUTED FEEDBACK STRUCTURES IN Ti:LiNbO3 WAVEGUIDES, to Ionov, et al.

Figure 1:
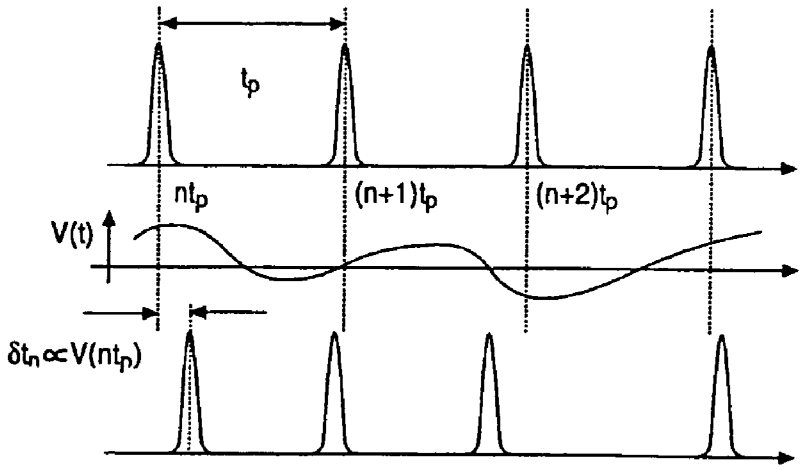
FIG. 1 is a diagram illustrating a pulse position modulation technique according to the prior art.
Figure 2:
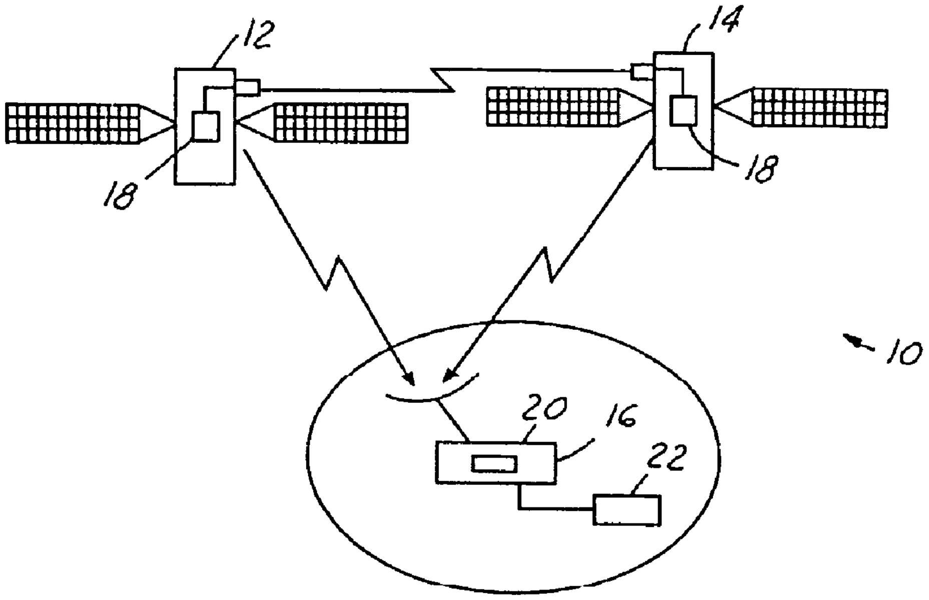
FIG. 2 is a broad overview of a communication system having a reflector formed according to the present invention.

Referring to FIG. 2 a broad overview of a communication system is shown having a reflector formed according to the present invention. Shown is a first satellite 12, a second satellite 14, a gateway station 16, a first optical communication system 18, a second optical communication system 20, and a data source 22.

The optical communication system is illustrated with respect to the first satellite 12, the second satellite 14 and the gateway station 16 that is, for example, positioned on the earth. The present invention is not limited to space-based communication systems as the present invention can be used for forming any surface or volume holograms. In some embodiments, the present invention is applicable to various types of terrestrial and extraterrestrial optical communication systems. The first satellite 12 and the second satellite both include the first optical communication system 18. The gateway station 16 can also include the second optical communication system 20. Consequently, the first satellite 12 and the second satellite 14 may communicate with each other using optical signals. Additionally, the gateway station 16 may also communicate directly with satellites 12 and 14 using optical communications. The gateway station 16 and thus optical communication system 20 may communicate with the data sources 22 using optical communication. Thus, the present invention can be utilized in many different types of optical communication systems.

Figure 3:
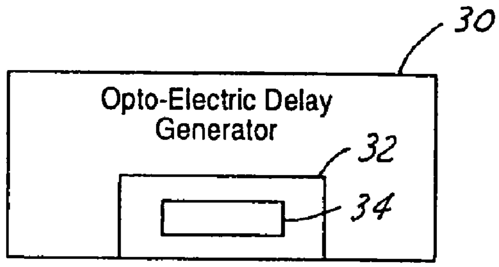
FIG. 3 is an opto-electric delay generator having a reflector formed according to the present invention.

Referring to FIG. 3, an opto-electric delay generator 30 is shown having a reflector formed according to the present invention. The opto-electric delay generator 30 can be a portion of the first optical communication system 18 or the second optical communication system 20 shown in FIG. 2. Shown is the opto-electric delay generator 30, an electro-optic waveguide 32 and a distributed feedback reflector 34.

The opto-electric delay generator 30 includes the electro-optic waveguide 32. The electro-optic waveguide 32 includes the distributed feedback reflector 34. Various types of opto-electric delay generators are known. The focus of the present invention is the manufacture of the distributed feedback reflector 34. Even more particularly, the present invention is related to the step of exposing a wafer to light, e.g., UV radiation, during the manufacture of a distributed feedback reflector 34. However, the present invention can be applied to creating interference patterns at many different types of targets.

Figure 4:
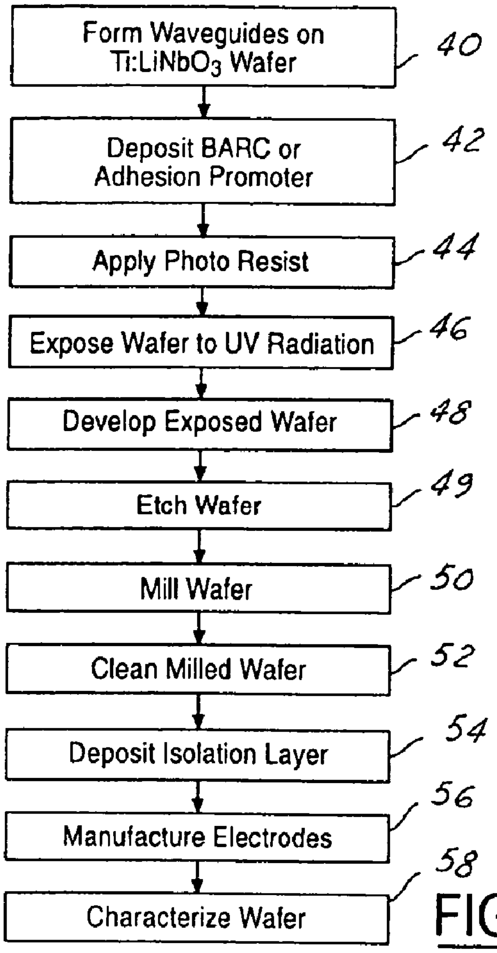
FIG. 4 is a flow diagram illustrating a process for making a reflector according to the present invention.

FIG. 4 is a flow diagram illustrating a process for making a distributed feedback reflector according to one embodiment of the present invention.

In one embodiment, a lithium niobate ($LiNbO_3$) substrate or wafer can be used. For example, a three inch Z-cut lithium niobate wafer, which has been doped with titanium to form from five to eight micron-wide waveguides can be used. Other wafer cuts, such as a y-cut, may be chosen for different applications. Additionally, other substrates may be used in accordance with the present invention. First, the titanium-doped waveguides are formed on a wafer 40. The wafer is then coated on the waveguide side with a broadband anti-reflection coating (BARC) or an adhesion promoter 42. The BARC helps in removing interference fringes caused by UV reflections from the front and back surfaces of $LiNbO_3$. A photo resist material is then applied to the side containing the waveguides and the BARC (or the adhesion promoter) 44. The adhesion promoter promotes adhesion of the photo resist to the wafer. It should be noted that no adhesion promoter is required if the BARC is used. Depending on the type of photo resist, applying the BARC or the adhesion promoter in step 42 may be eliminated.

A suitable type of photo resist in accordance with one embodiment of the present invention is the Ultra-I photoresist and a suitable type of BARC is available from the Shipley Company, LLC of Marlborough, Mass. In one embodiment, the thickness of the photoresist layer should be minimal. A sample can be formed using 4000 A of photoresist. It should be understood that other photoresists that are capable of producing 0.18 μm features may be used. This resolution is utilized when making a distributed feedback reflector with period of 0.36 μm, which is required for achieving a Bragg resonance in titanium-doped lithium niobate ($N_e$=2.145) at a wavelength λ=1565 nm.

Figure 5:
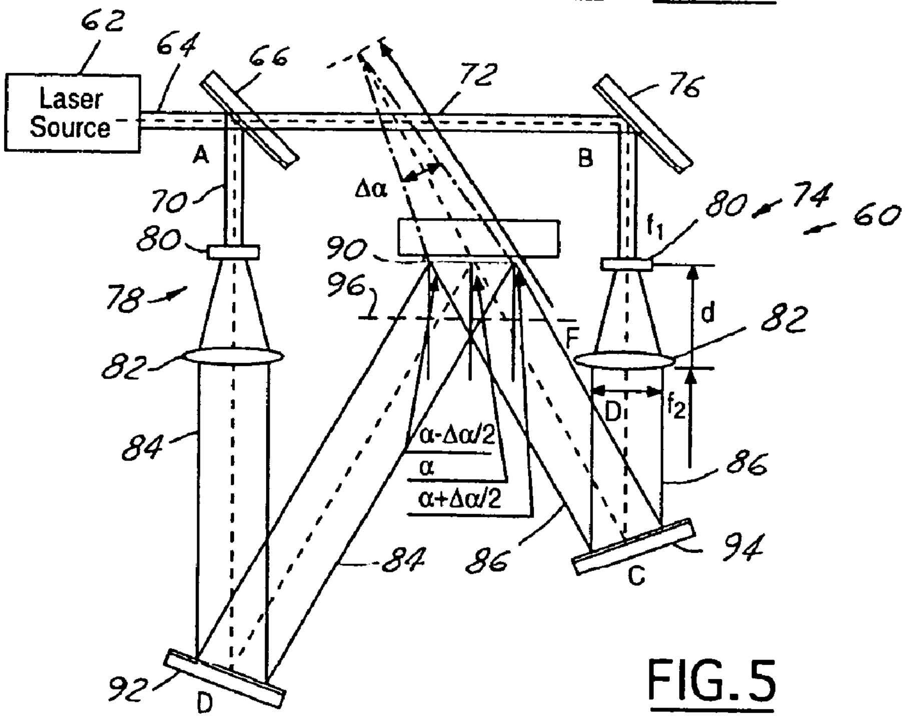
FIG. 5 is a diagram illustrating an interferometer for forming a grating in accordance with the present invention.
Figure 6:
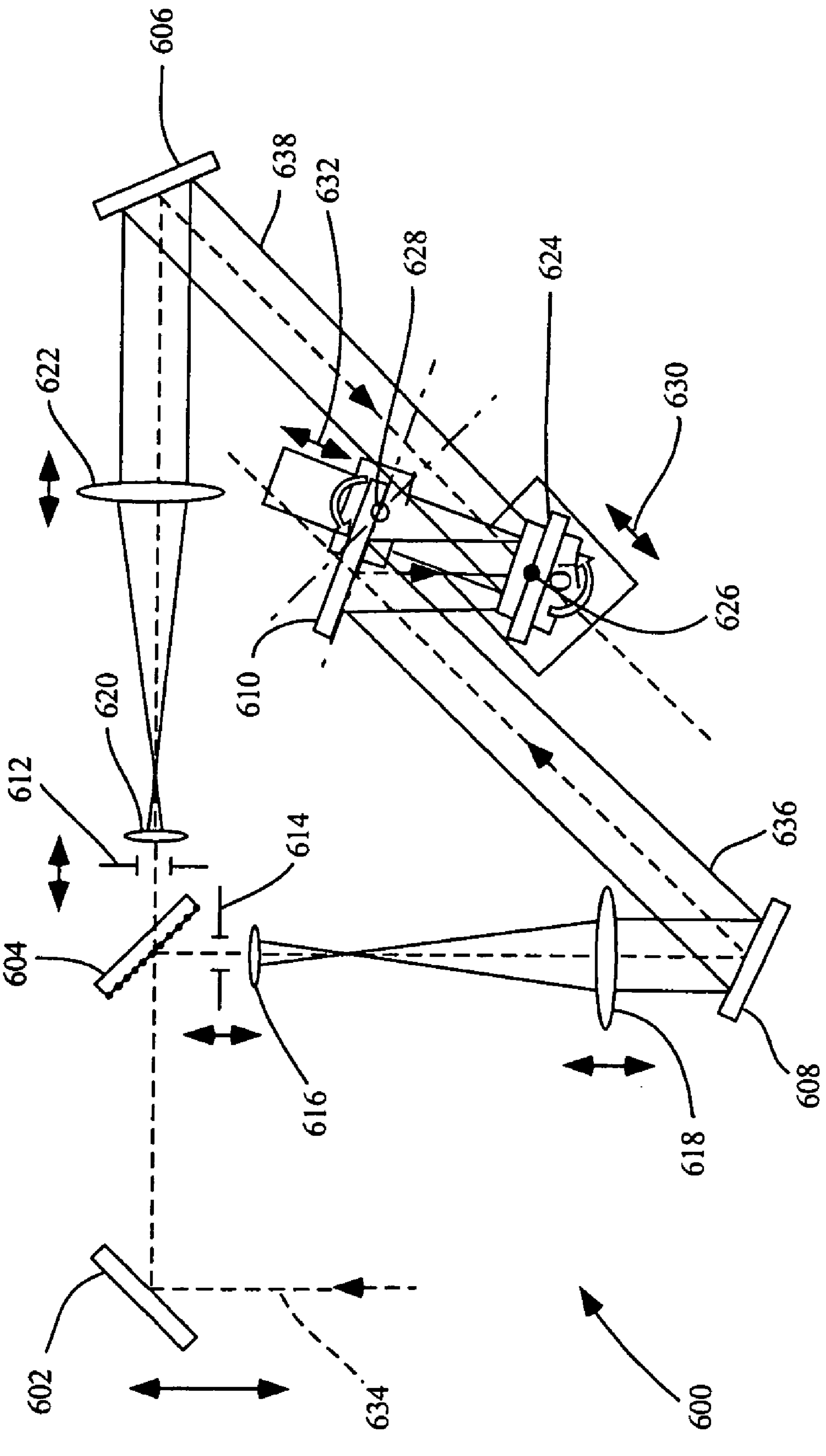
FIG. 6 is a diagram illustrating another interferometer for forming a grating in accordance with the present invention.

Next, the wafer having the photoresist thereon is exposed to ultraviolet radiation 46. As is best shown in FIGS. 5 and 6, an interferometer 60 is preferably used. The interferometer 60 will be described in greater detail herein with reference to FIGS. 5 and 6. A laser source 62 such as a quadrupled Nd:YAG laser having a wavelength of 266 nm can be used. The coherence length of the laser of over 10 cm at 3060 mW of power at 15 Hz repetition rate approximately 15 mm diameter at the entrance of the interferometer was used. The laser source 62 generates a laser beam 64 that is divided by a 50/50 splitter 66 into two split beams 70 and 72. It should be noted that the two path lengths from beam splitter are set in equal length within a few millimeters of tolerance. This keeps the path difference well below the coherence length of the ultraviolet laser source 62. Beam 72 is directed to a telescope 74 through a mirror 76. Beam 70 is also directed to a telescope 78. Each of the telescopes has a diverging lens 80 and a converging lens 82 having respective focal lengths of −40 mm and 200 mm. The distance d separating the lenses is 160 mm which is a summed combination of the focal lengths $f_1$ and $f_2$. Each of the shaped beams 84 and 86 are reflected to the wafer 90 using respective reflectors 92 and 94. A 46×3 mm aperture 96 is positioned along the side parallel to the plane of the figure in front of wafer 90 so that the most uniform area of beams is selected. The wafer is aligned so that the waveguides are oriented along the long edge of the beam (parallel to the plane of the figure). As evident from the figures, such configuration creates an oscillating optical field along the long axis of the laser spot. The angle of incidence ∝ of the ultraviolet beam was determined from the formula $$2\hat{} \sin\propto=\lambda_{uv} \quad (1)$$

where ^ is the required period for the distributed feedback reflector from the Bragg resonance condition $$\hat{}=\lambda_{ir}/2n_{o,e} \qquad (2)$$

where $\lambda_{ir}$ is the IR resonant wavelength and $n_{o,e}$ is the refraction index of $LiNbO_3$ at the extraordinary polarization of the IR beam. From (1) and (2), it is found that $$\sin\propto=n_e(\lambda_{uv}/\lambda_{ir}). \qquad (3)$$

Equation (3) determines the incident angle of UV beam $\lambda_{uv}$ that writes a uniform DFB structure that resonantly reflects back at the wavelength of $\lambda$. This results in $\sin\propto=0.365(\propto=21.4°)$ for $n_e\approx2.145$, $=\lambda_{uv}\approx266$ nm and $\lambda_{ir}\approx1565$ nm.

In chirped gratings, resonant conditions change linearly from $\lambda_{ir}-\Delta\lambda_{ir}/2$ at one end to $\lambda_{ir}+\Delta\lambda_{ir}/2$ at the other, which requires a linear change in the DFB period according to (2). Such a linear change in ^ may be achieved by adjusting the incident angles of both interfering beams (e.g., by focusing one and defocusing the other) from $\propto-\Delta\propto_2/2$ at one end to $\propto+\Delta\propto_2/2$ at the other, where $$\Delta\propto_2=-\tan\propto(\Delta\lambda_{ir}/\lambda_{ir}). \qquad (4)$$

Alternatively, the incident angle of one of the interfering UV beams is kept constant, while the other is changed by an amount $$\Delta\propto=-2\tan\propto(\Delta\lambda_{ir}/\lambda_{ir}). \qquad (5)$$

For illustrative purposes, it is assumed that the right incident beam is focused, as shown in FIG. 5. The focal length F of the two-lens telescope comprised of a concave lens $f_1$ and convex lens $f_2$ is given by $$1/F=1/f_1+1/f_1-d/(f_1*f_2), \qquad (6)$$

where $d=f_2+f_1+\Delta d$ is the distance between the two lenses and $\Delta d$ is the de-tuning from the position that results in a collimated beam. Noting that $F=D/\Delta\propto$, where D is the size of the UV beam at the output aperture of the telescope, it may be found from (6) that $$\Delta d=-(f_1*f_2/D)\Delta\propto. \qquad (7)$$

Combining (7) and (5), $$|\Delta d|=|2f_1*f_2\tan\propto(\Delta\lambda_{ir}/\lambda_{ir}*D)=0.98\text{ mm}, \qquad (8)$$

where it is assumed for illustrative purposes that $\Delta\lambda_{ir}=10$ nm and $\lambda_{ir}=1565$ nm.

Those skilled in the art will understand that other interferometer layouts that create interference patterns with the required period may be used instead in accordance with the method described herein. Also, other UV wavelengths, e.g., around 365 nm from an Ar-ion laser may also be employed.

In step 48, the exposed wafer is developed in the standard solution supplied by the manufacturer of the photoresist. If a BARC layer has been placed under photoresist, the wafer is first etched in a fluorocarbon plasma in step 49. The etching conditions depend on the plasma etching apparatus and must be determined independently for each machine, as explained by the BARC manufacturer (Shipley). In the present case, two minutes of etching in CF4 plasma was used. In step 50, the developed wafer is milled by an argon ion beam for 10–16 minutes at 100 mA current until the photoresist is gone. The ion beam energy is set at 500 V. Those skilled in the art will understand that other ion energies and time/current combinations may be employed. For example, reducing the current by 50% requires doubling the milling time. It is preferable that the ion beam is incident on the water at 65–70 degrees. However, other incident angles e.g., normal to the surface, may also be used.

In step 52, the processed wafer is cleaned in an ultrasonic cleaner for 5–15 minutes in acetone oriented face down. After milling and cleaning, applying an isolating layer on the top of the wafer may be found in step 54. For example, 0.5–1 microns of silicon oxide. After that, in step 56 electrodes may be deposited (e.g., gold electrodes), using any technique employed in making EO phase and amplitude modulators.

Figure 10:
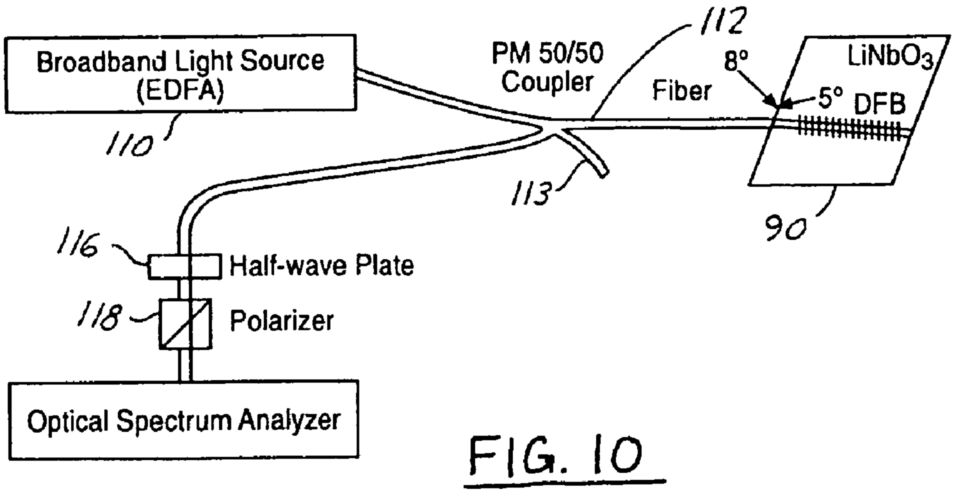
FIG. 10 is a diagram illustrating an analyzer device used to form a reflector according to the present invention.

Referring now to FIGS. 4 and 10, in step 58 the distributed feedback reflectors manufactured in the waveguides are characterized by the apparatus shown in FIG. 10. Before the wafer is characterized, the edges are cut off using a diamond saw at an 85 degree angle with respective to the waveguides. That is, a cut normal to the surface makes a 5 degree angle with the waveguides. The cut leaves a polished surface of optical quality at the input and the output of the waveguides. The non-normal cut is chosen to suppress reflection from the fiber waveguide interference. As illustrated, a broadband optical light source couples light into a polarization maintaining 50/50 fiber coupler 112. The other end 113 of fiber is unused in this embodiment. The broadband optical source may operate at 1530 to 1570 nm. The coupler's output fiber is used for directing light into the waveguide containing the manufactured DFB reflector. The end of the fiber is cut at an angle of 8 degrees along one of the polarization maintaining coupler axes which are not shown. The non-normal cut is chosen to suppress reflection from the fiber waveguide interface. The 8 degrees and 5 degrees cut angles match refraction conditions from fused silica to the lithium niobate. Those skilled in the art will recognize that other fiber/lithium niobate cut angles may satisfy refractive conditions between the two media. In general, the fiber cut angle should be kept between 7 and 9 degrees above before avoiding back reflection. On the other hand, very large cut angles are very difficult to achieve and to use in operation. The light reflected by the reflector is reflected back into the polarization maintaining fiber coupler 112. The optical signal is split into an optical spectrum analyzer 114 by the coupler 112, it passes through a halfway plate 116 and a polarizer 118.

Referring to FIG. 6, a diagram is shown illustrating another interferometer for forming a grating in accordance with the present invention. Shown is a first mirror, a beam splitter, a third mirror, a forth mirror, a fifth mirror, a first diaphragm, a second diaphragm, a first lens, a second lens, a third lens, a fourth lens, a target, a main beam, a first split beam, a second split beam, a first rotation point, a second rotation point, a first axis of movement, and a second axis of movement.

The main beam is directed at the first mirror. The first mirror directs the main beam to the beam splitter. The beam splitter can be a 50/50 beam splitter. The 50/50 beam splitter creates the first split beam and the second split beam. The first split beam is directed through the first diaphragm, the first lens and the second lens. The first split beam is then reflected off of the fourth mirror and the fifth mirror onto the target. The second beam is directed through the second diaphragm, the third lens and the fourth lens. The second beam is then reflected off of the third mirror onto the target. As the first split beam and the second split beam reach the target, the beams interfere and cause a light pattern at the target, thus exposing the photoresist on the target.

The present invention creates high-quality surface and volume holograms with well-characterized spatial periods and chirps. The period and chirp of the holograms is controlled by respectively adjusting the incident angle and divergence of the incident beams. Advantageously, the architecture of the two-beam interferometer shown in FIG. 6 circumvents many traditional obstacles encountered when attempting to interfere two well-characterized optical beams on a target.

One problem the interferometer is able to overcome is that in order to adjust the spatial period of a hologram, the incident angle of the interfering beams in fine tuned while maintaining their spatial overlap. This is a cumbersome procedure which needs to be repeated multiple times if a high-tolerance of the spatial period, i.e., within 0.1% or better, is required.

Another obstacle is that often large-area holograms of greater than 1 $cm^2$ are required which necessitates the use of large homogeneous interfering beams. Such beams are created by expanding the output of well-characterized, single-transverse-mode lasers from 1–2 mm diameter to several centimeters. Such beam expansion is hard to implement without truncating the edges of the expanded beams on the various apertures in the holographic setup. The beam truncation causes diffraction, which manifests itself as additional patterns in the hologram. These parasitic patterns modulate the dominant grating of the hologram and reduce the overall performance of the final product. In addition to diffraction on edges, large beam expansion decreases the power density of the interfering beams which then requires undesirable lengthy exposure of the photoresist.

Yet another obstacle is the small inhomogeneities in the spatial distribution of the interfering beams (which may be cause, e.g., by diffraction on dust particles) result in hologram degradations similar to those caused by diffraction on apertures. Spatial filters and a clean-room environment may be used to avoid this kind of beam degradation on small particles.

Advantageously, the interferometer shown provides the means for fine-tuning the fringe period and making an arbitrary chirp. Additionally, the diffraction is removed from the system apertures completely by using aperture imaging in both beam channels. Additionally, a very uniform exposure over the entire interference field is created by beam scanning either the main beam or both of the two interfering beams, i.e. the first split beam and the second split beam.

Precise control of the fringe period, i.e., the distance between the constructively interfering light at the target, is accomplished by creating an interference pattern between the first split beam and the second split beam on the target (e.g., a 3" dia., $LiNbO_3$ wafer covered with two layers: a broad band anti-reflection coating (BARK) and a photoresist). The set-up of the interferometer allows precise adjustments of the fringe period. The set-up controls the incident angles of the interfering beams while maintaining their overlap on the target and keeping the bisector of the incident rays at a right angle to the target. This is achieved by utilizing the first rotation point, the second rotation point, the first axis of movement, and the second axis of movement. This is shown in greater detail in FIG. 7.

Figure 7:
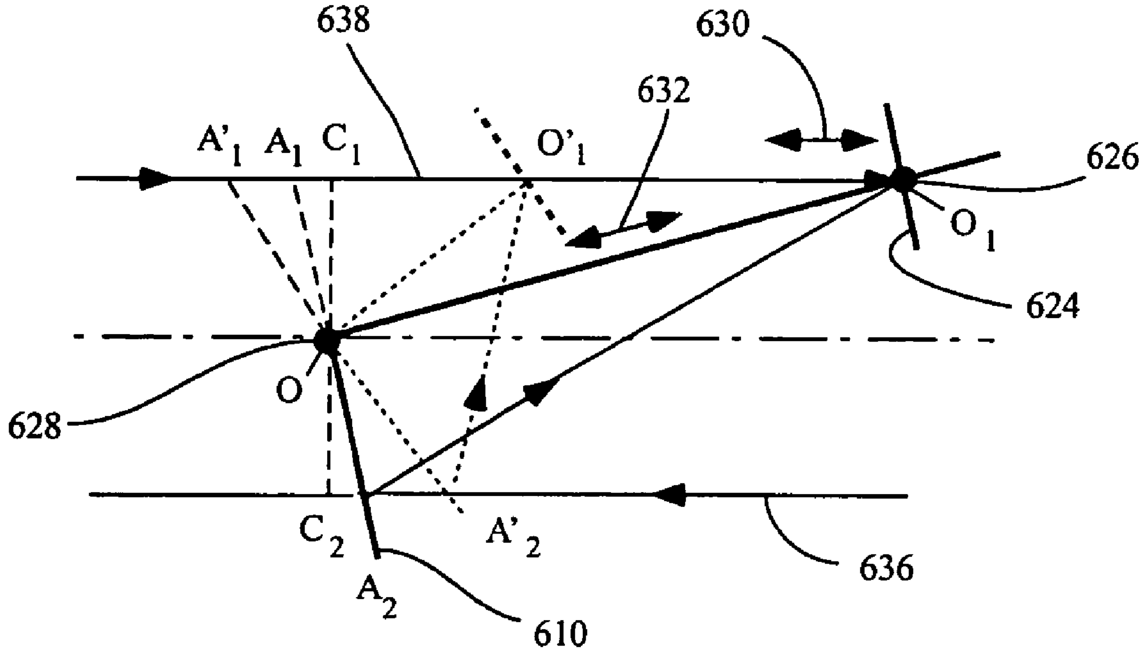
FIG. 7 is a diagram illustrating a portion of the interferometer for forming a grating of FIG. 6.

Referring to FIG. 7 a diagram is shown illustrating a portion of the interferometer for forming a grating of FIG. 6. Shown is the fifth mirror, the target, the first split beam, the second split beam, the first rotation point, the second rotation point, the first axis of movement, and the second axis of movement. The second axis of movement is parallel to the propagation of the second split beam.

The fifth mirror is mounted on the second rotation point with a stationary axis O. The stationary axis is perpendicular to the figure plane and positioned in the middle between the first split beam and the second split beam. The target is mounted on the first rotation point, whose axis $O_1$ can be moved along the first axis of movement by a computer-controlled translation stage.

The first rotation point and the second rotation point are coupled to each other along the first axis of movement such that the fifth mirror and the target are kept parallel to each other when the target is moved along the second axis of movement. In one embodiment, this is achieved by attaching a stationary rail and a movable carriage to the second rotational point and the first rotational point, respectively. The fifth mirror and the target are firmly attached, in turn, to the stationary rail and the movable carriage. Thus, as the target moves along the first axis of movement, the stationary rail moves around the second rotational point. Simultaneously, the target rotates in the same direction as the fifth mirror and by the same angle around the first rotational point because it is attached to the movable carriage. The fifth mirror can move along the second axis of movement to accommodate for the corresponding change in the distance between the first rotational point and the second rotational point. In an alternative embodiment, the same functionality may be achieved by attaching the movable carriage to the second rotational point and the stationary rail to the first rotational point. Other means of coupling the target and the mirror may be used in accordance with the present embodiment.

It can be seen from FIG. 7 that at any angle between the first split beam and the second split beam (which is dictated by the position of the target along the first axis of movement) the incident beams intersect the target at the first rotational point. Therefore, the spatial period of the interference pattern created by the first split beam and the second split beam is adjusted by moving the target with the computer-controlled translation stage along the first axis of movement. These adjustments do not change the overlap between the interfering beams on the target. Moreover, the described arrangement retains the relative path lengths of the interfering beams while the position of the translation stage and the corresponding incident angles of the interfering beams are changed. The optical path lengths of the beams as measured from a plane $C_1$ $C_2$ are $A_1O_1$-$C_1A_1$ and $A_2O_1$-$C_2A_2$, respectively. Since $A_1O_1$=$A_2O_1$ ($OO_1$ bisects the angle $A_1O_1A_2$) and $C_1A_1$-$C_2A_2$, the equality of the path lengths of the interfering beams is maintained for any position of the target.

Referring back now to FIG. 6, in order to achieve a uniform hologram over a large area it is necessary to mitigate any diffractions on the edge of the main beam. In one example, beam comes from a light source which is a single-line (365 nm) Ar laser which produces a nearly Gaussian beam with less than 2 mm diameter. Thus, the beam is considerably expanded in order to obtain expose over such a large surface area, and in doing so, it is advantageous to avoid diffraction on various apertures. One way this is achieved is by using ten-fold beam expanders that image entrance the first diaphragm and the second diaphragm on the target in each arm of the interferometer and translating the beam across the field, as will be describe below. In one embodiment two identical, pairs of lenses (i.e., the first lens, the second lens and the third lens, the fourth lens) are positioned to form telescopes. The distance between the lenses is equal to the sum of their respective focal lengths $B=f_1+f_2=f_3+f_4$. This is shown more clearly in FIG. 8.

Figure 8:
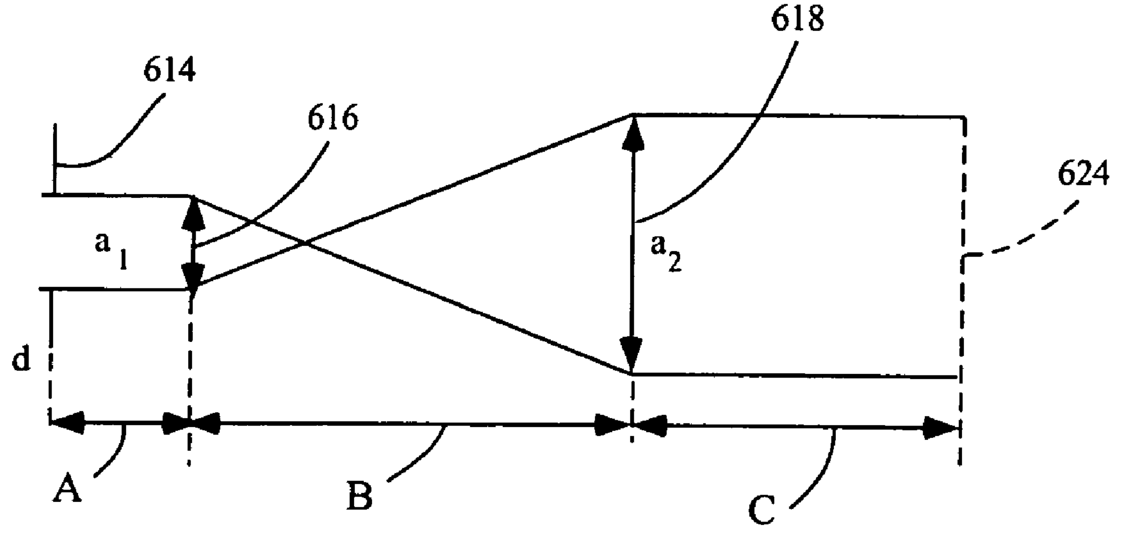
FIG. 8 is a diagram illustrating a telescope and an aperture utilized in the interferometer of FIG. 6.

Referring now to FIG. 8 a diagram is shown illustrating a telescope and an aperture utilized in the interferometer of FIG. 6. Shown is the first diaphragm, the first lens, a distance $a_1$, the second lens, a distance $a_2$, a distance A, a distance B, and a distance C.

Applying the standard lens formula for a two-lens telescope, such as is shown in FIG. 8, it can be determined that the first aperture is imaged onto the target when the distances A between the aperture and the first lens of the expander and C between the second lens of the expander and the target are chosen according to $$A-B/M+C/M^2=0, \tag{9}$$

where $M=f_2/f_1=a_2/a_1$ is the magnification of the expander. This relationship is satisfied by moving the entrance of the first aperture and the second aperture with respect to the corresponding lenses. Thus, the combination of placing the target in the image plane of the aperture and directing each of the first split beam and the second split beam through an aperture after the beam splitter greatly removes diffraction from the system. This creates a grating with well defined periods and chirps.

A similar result may be achieved by placing the beam splitter after a single aperture, however, such as setup may be inferior in mitigating unwanted diffraction effects because of the aberrations experienced by the diffracted beam while it propagates through the beam splitter. Therefore, it is preferred to use two apertures and have each beam sent through an aperture, expanded by a telescope and imaged on the target in different beam paths of the interferometer independently.

Again, referring back to FIG. 6, a uniform exposure is created by scanning the two optical beams across the field. This is achieved by moving the first mirror at a constant speed by a computer controlled translation staged. As a result, any point on the target along the direction of the scan is exposed by all of the sections of the beam, thus averaging out any imperfections in the beam. Moreover, scanning the two optical beams provides an easy way to control the exposure, as can be determined from the following considerations.

The spatial intensity distribution of a Gaussian beam is given by $$I(x,y)=I_o \exp(-2((x^2+y^2)/\omega_o^2)), \tag{10}$$

where $\omega_o$ is the beam radius O.E., $I_o=2P/\pi\omega_o^2$, where $I_o$ is the peak intensity and P is the average power of the beam. Assuming that the beam is scanned along x, and x=Vt, where V is the velocity of the scan, we get the following equation for the exposure $$E=\int I_o \exp(-2(y/\omega_o)^2)\cdot\exp(-2(x/\omega_o)^2)dt/V=(2/\pi)^{1/2}(P/V\omega_o^2)\cdot\exp(-2(y/\omega_o)^2). \tag{11}$$

This equation shows that the overall exposure is determined by the optical power and the scanning velocity. The scanning technique is particularly useful for writing long interference patterns, since in this case only a modest beam expansion is required for achieving uniformity in the y-direction, whereas the uniformity along x is achieved by the scanning. Moreover, computer controlled scanning offers the capability of writing grating with programmed exposure changes along the length. This technique may be used, for example, in making apodized gratings that have advantageous dispersion characteristics, as compared to a uniform grating.

The interferometer of FIG. 6 also provides flexible chirp control. Holographic gratings with linear and quadratic chirps can be written using interfering beams with different divergences. The interferometer offers two additional means for controlling the chirp of the grating. Moreover, these techniques may yield gratings with any desired chirp pattern in addition to the commonly found linear and quadratic patterns.

The first means for controlling the chirp grating can be achieved by changing the incident angles of the interfering beams while the beams are scanned along the target, thereby changing the fringe period along the hologram according to a pre-determined rule.

The second means mach achieve the same effect by moving the output telescope lens in one of the interferometer arms. By having the two telescopes after the beam splitter, two different beams may be interfered and thus create complex chirp patterns. The first means is preferred when large chirps are desired, whereas the second means is preferred when the accuracy in the period variations is very important and the magnitude of the chirps is small, e.g., less than $10^{-2}$.

Figure 9:
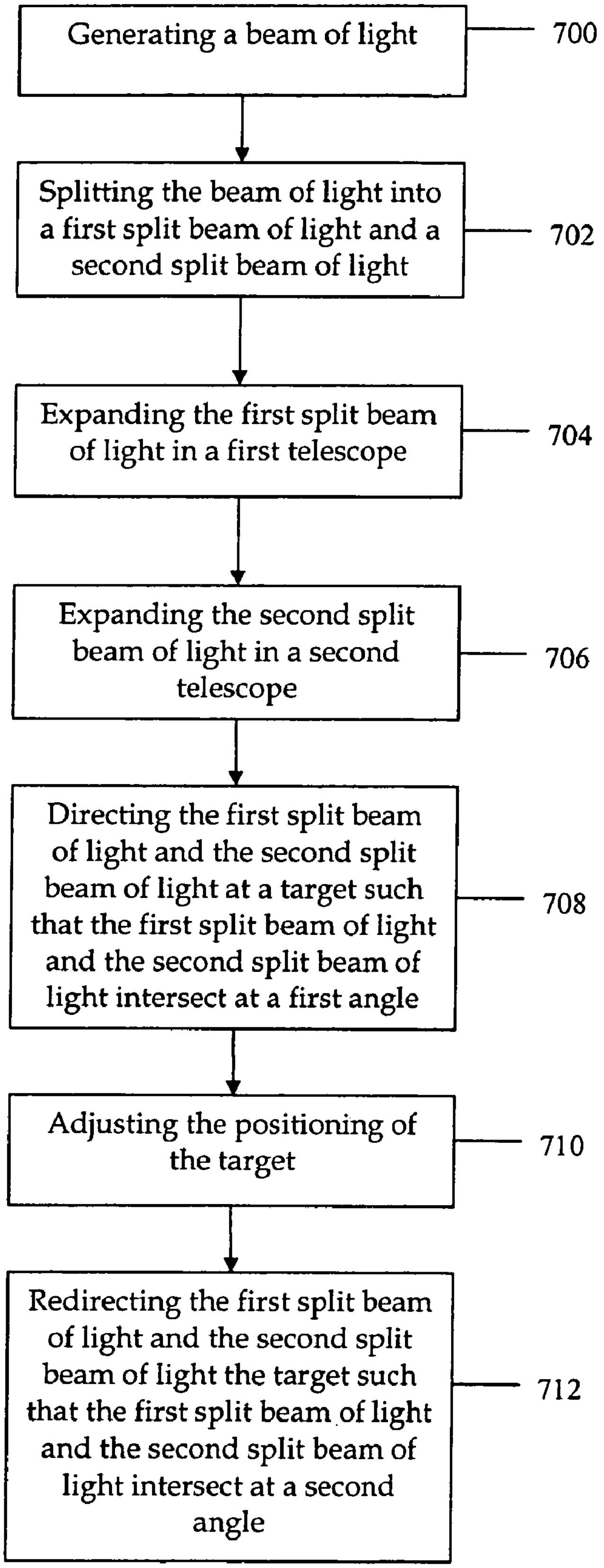
FIG. 9 is a method for directing beams of light at a target utilizing the interferometers of FIGS. 5 and 6.

Referring to FIG. 9 a method is shown for directing beams of light at a target utilizing the interferometers of either FIG. 5 or FIG. 6.

First a beam of light is generated 700, e.g., utilizing a laser. One example of a laser that can be used in accordance with the present embodiment is single-line (365 nm) Ar laser which produces a nearly Gaussian beam with less than a 2 mm diameter. Many other light sources may be used in accordance with the present invention in order to generate the beam of light.

Next, the beam of light is split into a first split beam of light and a second split beam of light 702. This can be accomplished using a beam splitter such as has been described herein. Alternatively, other types of beams splitters may be used in accordance with the present method. After the beam of light is split into two beams, the first split beam of light is expanded in a first telescope 704 and the second split beam of light is expanded in a second telescope 706. The telescopes can have identical lenses spaced the same distance apart or alternatively can utilize different lenses or can be spaced at different distances from each other. Having the lenses space at different distances apart or having different lenses allows for the generation of complex gratings, such as has been described herein.

Next, the first split beam of light and the second split beam of light are directed at a target such that the first split beam of light and the second split beam of light intersect at a first angle 708. As shown in FIGS. 5 and 6 this step can be accomplished using a plurality of mirrors.

In an alternative step the positioning of the target can be adjusted 710. As described above, this can be done by a computer controlled mechanical device. This allows for precise control of the positioning of the target. As the target is repositioned the first split beam of light and the second split beam of light are redirected at the target such that the first split beam of light and the second split beam of light intersect at a second angle 712. In one embodiment, this is done by rotating one of the plurality of mirrors used in the redirection.

Figure 11:
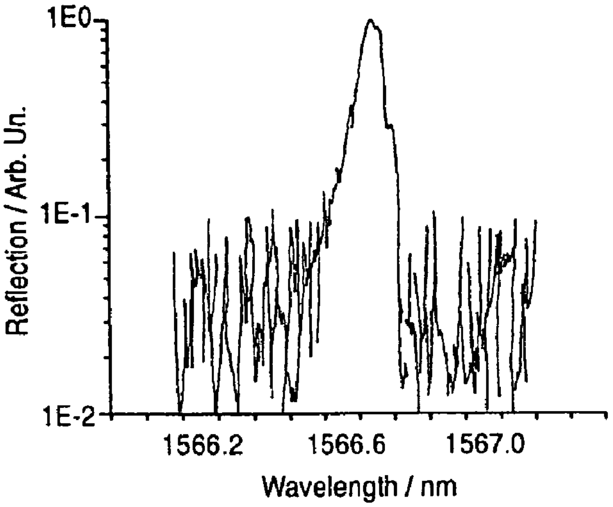
FIG. 11 is a diagram illustrating a plot of wavelength versus reflection for the device illustrated in FIG. 10 having a uniform grating.

Referring to FIG. 11 a diagram is shown illustrating a plot of wavelength versus reflection for the device illustrated in FIG. 10 having a uniform grating. A measure reflection spectrum of a uniform (non-chirped) DFB is illustrated. The reflection at the peak is above 5 to 10 percent in both FIGS. 10 and 11. The reflected light is polarized nearly along the Z axis of the wafer, as is expected from the Bragg conditions.

Figure 12:
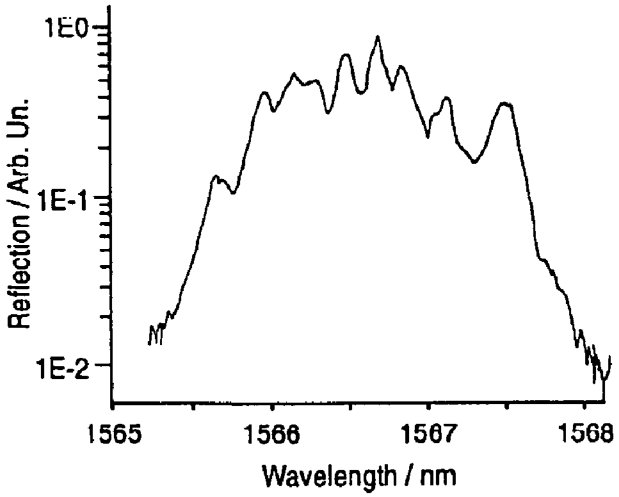
FIG. 12 is a diagram illustrating a plot of reflection versus wavelength for a chirped grating using the device of FIG. 10.

Referring to FIG. 12 a diagram is shown illustrating a plot of reflection versus wavelength for a chirped grating using the device of FIG. 10. The chirped grating is not flat across the stop band, which is attributed to the residual non-uniformity of the UV beam. The spike wiggles in the stop band may be eliminated by using a transform limited beam in the lithographic process.

While the invention herein disclosed has been described by means of specific embodiments and applications thereof, other modifications, variations, and arrangements of the present invention may be made in accordance with the above teachings other than as specifically described to practice the invention within the spirit and scope defined by the following claims.

We claim:

1. An apparatus for directing light beams onto a target comprising:

a beam splitter for splitting a main beam into a first split beam and a second split beam;

a first beam path for the first split beam, the first beam path including a first aperture, a first lens and a second lens;

a second beam path for the second split beam, the second beam pat including a second aperture, a third lens and a fourth lens; and a plurality of mirrors arranged such that the first split beam and the second split beam intersed at the target.

2. The apparatus of claim 1 farther comprising computer means for controlling the means for rotating the target.

3. The apparatus of claim 2 further comprising means for rotating the target while the first split beam and the second split beam are intersecting at the target.

4. The apparatus of claim 1 further comprising means for creating a very unifonn exposure over an entire interference field by beam scanning.

5. The apparatus of claim 1 further comprising placing the target in the image plane of the first aperture and the second aperture.

6. The apparatus of claim 1 wherein the first aperture partially blocks the first split beam from reaching the target and the second aperture partially blocks the second split beam from reaching the target.

7. The apparatus of claim 6 wherein the first aperture and the second aperture are adjusted such that the target is in the image plane of the first split beam and the second split beam.

8. An apparatus for direct light beams onto a target comprising:

means for generating a beam of light;

means for splitting the beam of light into a first split beam of light and a second split beam of light;

means for expanding the first split beam of light;

means for expanding the second split beam of light;

means for directing the first split beam of light and the second split beam of light at a target such that the first split beam of light and the second split beam of light intersect at a first angle; and means for placing a target in the image plane of a first aperture and a second aperture.

9. The apparatus of claim 8 further comprising:

means for partially blocking the first split beam from reaching the target; and means for partially blocldng the second split beam from reaching the target.

10. The apparatus of claim 9 further comprising means for redirecting the first split beam of light and the second split beam of light the target such that the first split beam of light and the second split beam of light intersect at a second angle.

11. The apparatus of claim 8 further comprising means for creating a very uniform exposure over an entire interference field by beam scanning.

12. The apparatus of claim 8 wherein the first split beam is directed through a first telescope and the second split beam is directed through a second telescope.

13. The apparatus of claim 12 wherein the first split beam has a first divergence and the second split beam has a second divergence; wherein the first divergence is different than the second divergence.

14. A method of directing light beams onto a target comprising the steps of:

generating a beam of light;

splitting the beam of light into a first split beam of light and a second split beam of light;

directing the first split beam through a first aperture;

expanding the first split beam of light in a first telescope;

directing the second split beam through a second aperture;

expanding the second split beam of light in a second telescope; and directing the first split beam of light and the second split beam of light at a target such that the first split beam of light and the second split beam of light intersect at a first angle.

15. The method of claim 14 further comprising the steps of:

adjusting the positioning of the target; and redirecting the first split beam of light and the second split beam of light the target such that the first split beam of light and the second split beam of light intersect at a second angle.

16. The apparatus of claim 14 further comprising placing the target in the image plane of the first aperture and the second aperture.

17. The apparatus of claim 14 further comprising creating a very uniform exposure over an entire interference field by beam scanning.

* * * * *